United States Patent [19]

Ohtsuka

[11] 4,122,625
[45] Oct. 31, 1978

[54] TRAP FOR SMALL ANIMALS DOING HARM TO POSSESSIONS

[76] Inventor: Tomoaki Ohtsuka, 10-22, Misaki 5-chome, Suminoe-ku, Osaka, Japan

[21] Appl. No.: 799,193

[22] Filed: May 23, 1977

[51] Int. Cl.² ............................................. A01M 23/24
[52] U.S. Cl. ............................................ 43/82; 43/85
[58] Field of Search ................ 43/58, 77, 78, 81, 81.5, 43/82, 83, 85, 87

[56] References Cited

U.S. PATENT DOCUMENTS

| 1,535,001 | 4/1925 | Weisenburger | 43/85 |
|---|---|---|---|
| 1,630,969 | 5/1927 | Ruby | 43/82 |
| 1,795,806 | 3/1931 | Swann | 43/81 |
| 2,510,655 | 6/1950 | Price | 43/85 |

Primary Examiner—N. P. Godici

[57] ABSTRACT

One end of a base plate is formed with an elongated opening and the other end rotatably supports the base end of an elastic plate whose free end is inserted in the above mentioned elongated opening. The elastic plate is longer than the base plate and formed with an engagement projection adjacent the free end thereof. In setting the elastic plate, it is upwardly curved and an engagement member is interposed between the upper surface of the base plate and the engagement projection so as to engage the elastic plate and maintain its curved condition. The engagement member will be moved by a small animal taking a bait or by the weight of a small animal treading on the base plate. Such movement of the engagement member results in relieving the engagement, so that the elastic plate is instantaneously elastically restored to its flat condition, thereby trapping the small animal by squeezing it between the base plate and the elastic plate.

10 Claims, 14 Drawing Figures

TRAP FOR SMALL ANIMALS DOING HARM TO POSSESSIONS

The present invention relates to a trap for rats and other small animals doing harm to possessions.

There have heretofore been known various types of traps for house rats and field mice, hares, overbred pigeons or other small animals doing harm. However, such known traps are not desirable in that they are expensive and liable to make rats and the like cautious.

The principal object of the present invention is to provide a trap which is capable of positively catching rats and the like and which is simple in construction and can be produced at a low cost.

More particularly, the invention provides a trap comprising a base plate having an elongated opening formed in one end portion thereof, the other end of said base plate rotatably supporting the base end of an elastic plate which is longer than the base plate and which has an engagement projection formed on its free end side, the free end of said elastic plate being inserted in said elongated opening, said elastic plate being upwardly curved between said base end and said elongated opening with an engagement member interposed between the upper surface of the base plate and said engagement projection to maintain the curved condition of said elastic plate, the arrangement being such that the engagement member will be moved by a rat or the like taking a bait or by the weight of a rat or the like treading on the base plate, such movement of the engagement member resulting in relieving the engagement, so that the elastic plate is elastically restored to its flat condition, thereby trapping the rat or the like by squeezing it between the base plate and the elastic plate.

According to such trap, since it takes simply a tunnel form when set for catching rats or the like, there will be no possibility of making rats or the like cautious. When a rat is lured by a bait and takes it or treads on a footboard attached to the base plate, the engagement member is moved to relieve the engagement with the engagement projection, so that the elastic plate is instantaneously elastically restored to its flat condition, thereby positively catching the rat or the like between the elastic plate and the base plate. Further, since there is no need to mix a poison into the bait, there is no danger of causing personal accidents due to a poison. Further, since the trap of the present invention is very simple in construction consisting of a base plate and an elastic plate, there also is a merit that it can be provided at a low cost.

Other numerous features and merits of the present invention will be readily understood from the following description of preferred embodiments of the invention illustrated in the accompanying drawings.

FIGS. 1 through 3 show a first embodiment of the invention;

FIG. 1 is a perspective view;

FIG. 2 is a longitudinal section;

FIG. 4 is a perspective view;

FIG. 5 is a longitudinal section;

FIG. 8 is a perspective view;

FIG. 9 is a longitudinal section;

FIG. 10 is an exploded perspective view;

FIG. 11 is a perspective view; and

FIG. 12 is a longitudinal section.

Figure 1:
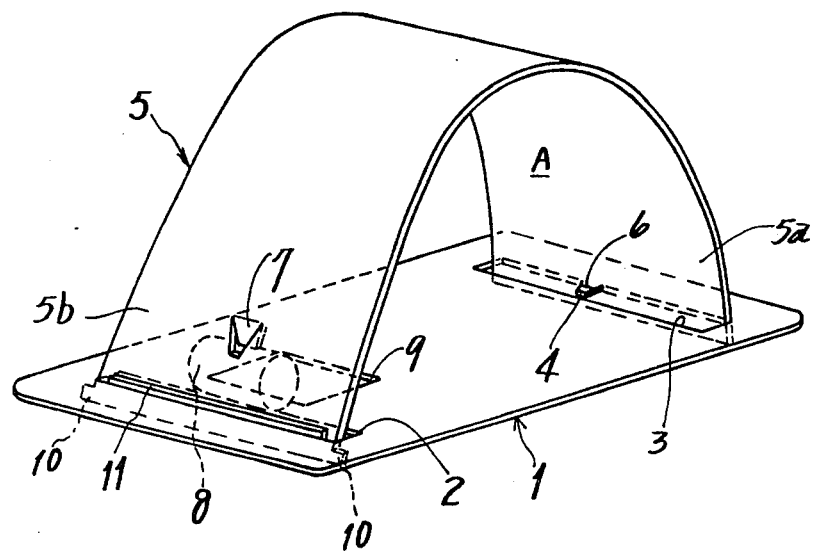
Figure 2:
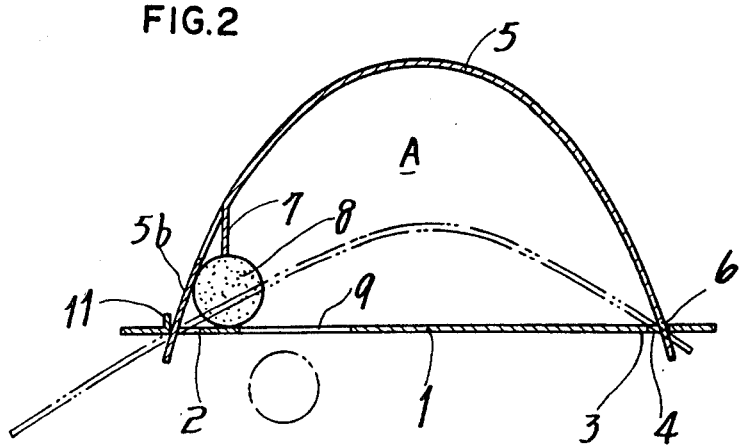
Figure 3A:
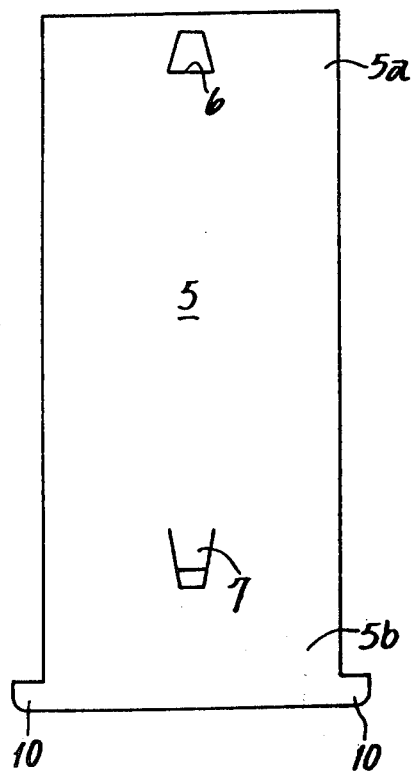
FIGS. 3a, 3b and 3c are plan views and a perspective view of components.
Figure 3B:
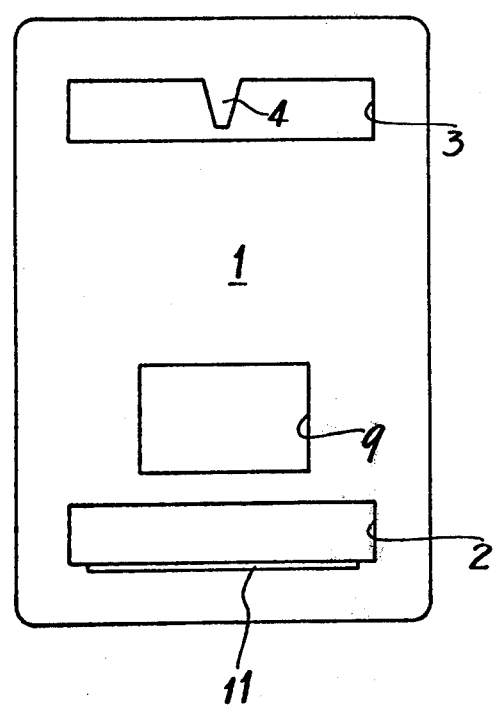
Figure 3C:
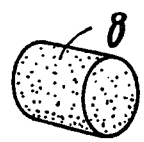

A first embodiment shown in FIGS. 1 through 3 comprises a base plate 1 having elongated openings 2 and 3 formed therein at its opposite ends and a projection 4 formed at the middle of the outer side of said elongated opening 3 and projecting into said elongated opening 3, an elastic plate 5 adapted to have its base end 5a and free end 5b inserted in the elongated openings 2 and 3 in said base plate 1 in such a manner that a hole 6 formed in said base end 5b receives said projection 4 and that when said elastic plate is arcuately bent it cooperates with the base plate 1 to define a semicircular space A, an engagement projection 7 formed by partly cutting and bending a suitable portion of the free end 5b of the elastic plate toward the inner wall side, and a cylindrical solid bait 8 interposed between said engagement projection 7 and the base plate 1 and adapted to maintain the arcuately bent condition of the elastic plate 5. The numeral 9 designates an escapement hole for the solid bait 8 formed in the base plate 1 near the location of the solid bait 8; 10, stops projecting from opposite sides of the free end 5b of the elastic plate; and the numeral 11 designates a cut bend for guiding the elastic plate 5. In addition, said solid bait 8 is a dried mass of paste of fish meal, beans, oil meal, wheat flour or other foods which are favorites with rats. The solid bait 8 may, of course, be peanuts, candies, potatoes or the like.

The way the above described trap is used for catching rats is as follows.

The trap set in the manner shown in solid lines in FIGS. 1 and 2 is laid in a place where rats are supposed to appear. A rat is lured by the bait 8 into the semicircular space A and begins to take the bait 8. In this connection, my investigation has shown that rats have the habit of taking such bait 8 while holding and rotating it with their front feet. Therefore, the rat holding and rotating the bait 8 results in the bait being pulled toward the rat until it is disengaged from between the engagement projection 7 and the bottom plate 1. In this connection, the cylindrical form of the bait 8 assures stabilized engagement and hence easy setting and yet facilitates disengagement to the extent that even if the bait is slightly moved, the engagement can be easily relieved. Then, as shown in phantom lines in FIG. 2 and in FIG. 7, the elastic plate 5 in the curved condition is elastically restored to its flat condition at a stretch with a fulcrum provided by the place of engagement between the hole 6 of the base end 5a and the projection 4 on the bottom plate 1, so that the rat is caught by being squeezed between the elastic plate 5 and the base plate 1. In this case, the bait 8 falls into the hole 9 and hence there is no possibility of the bait 8 being caught between the elastic plate 5 and the base plate 1 to interfere with the catching of the rat. Further, the head of the rat is fitted in the hole 9 or its incisive teeth catch in the hole 9 to prevent the escapement of the rat from the trap, assuring positive capture thereof.

Figure 4:
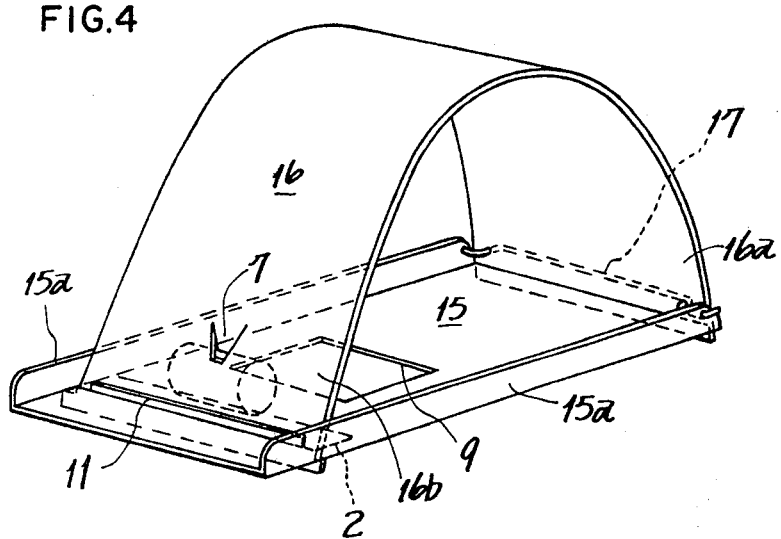
FIGS. 4 and 5 show a second embodiment of the invention.

A second embodiment of the invention will now be described with reference to FIGS. 4 and 5. In this embodiment, opposite edges 15a of a base plate 15 extending in a direction in which an elastic plate 16 is stretched or curved are upwardly bent to provide rising pieces. In this case, what corresponds to the escapement hole 9 for the bait 8 in the first embodiment is not absolutely necessary, but it is preferable to provide a hole 9 as shown. Further, the base end 16a of the elastic plate 16 is rotatably supported on a support shaft 17 disposed between one of the respective ends of said rising pieces 15a.

Figure 5:
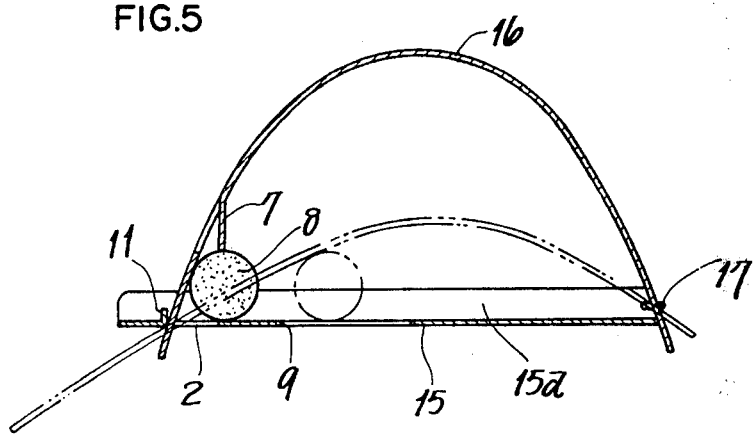

In the arrangement described above, if a rat takes a bait 8 shown in solid lines in FIG. 5, the engagement between the bait 8, engagement projection 7 and base plate 15 is relieved, whereupon the elastic plate 16 is elastically restored to its flat condition (as shown in phantom lines in FIG. 5 and in FIG. 7) at a stretch, so that the rat is squeezed between the elastic plate 16 and the base plate 15. In this case, the bait 8 exists between the elastic plate 16 and the opposed edges 15a, but since the opposed edges 15a are erected, there is no possibility that the rat will escape. Further, the head or the incisive teeth of the rat catch on the base plate edges 15a or in the hole 9, so that the rat can be positively captured.

Figure 6:
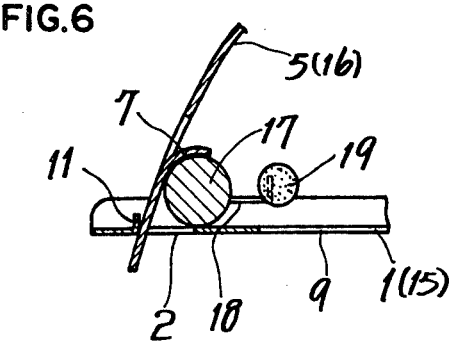
FIG. 6 is a sectional view showing the principal portions of a modification of the embodiment shown in FIGS. 1 and 2.
Figure 7:
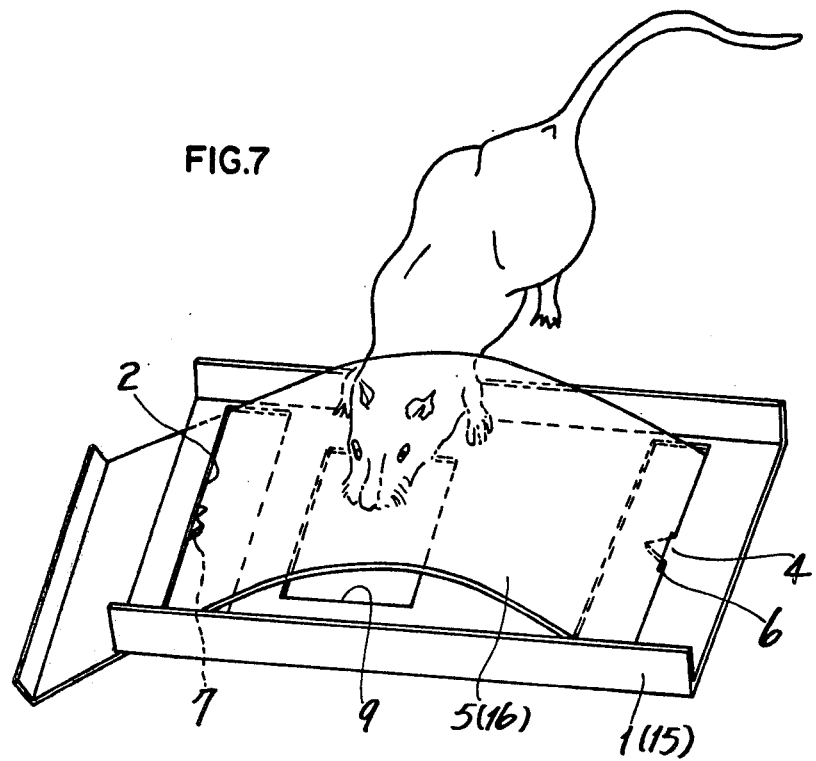
FIG. 7 is a perspective view showing a rat in caught condition.

In addition, in the first and second embodiments described above, the solid bait 8 has been described as being interposed between the engagement projection 7 of the elastic plate 5 and the base plate 1, but the arrangement is not limited thereto. For example, as shown in FIG. 6, a cylindrical engagement member 17 different from a bait may be interposed between the engagement projection 7 and the base plate 1 or 15, said engagement member 17 having an L-shaped arm 18 projecting therefrom with a bait 19 carried at the front end of said arm 18, the arrangement being such that if a rat takes the bait 19, the engagement member 17 is disengaged from between the engagement projection 7 and the base plate 1 or 15. Further, the engagement projection 7 may be formed by partly cutting a portion of the free end of the elastic plate and arcuately bending the same so as to engage the top of the engagement member 8 or 17 from below, as shown. In addition, the arrangement shown in FIG. 7 is a modification in which the arrangements shown in the first and second embodiments are combined.

Figure 8:
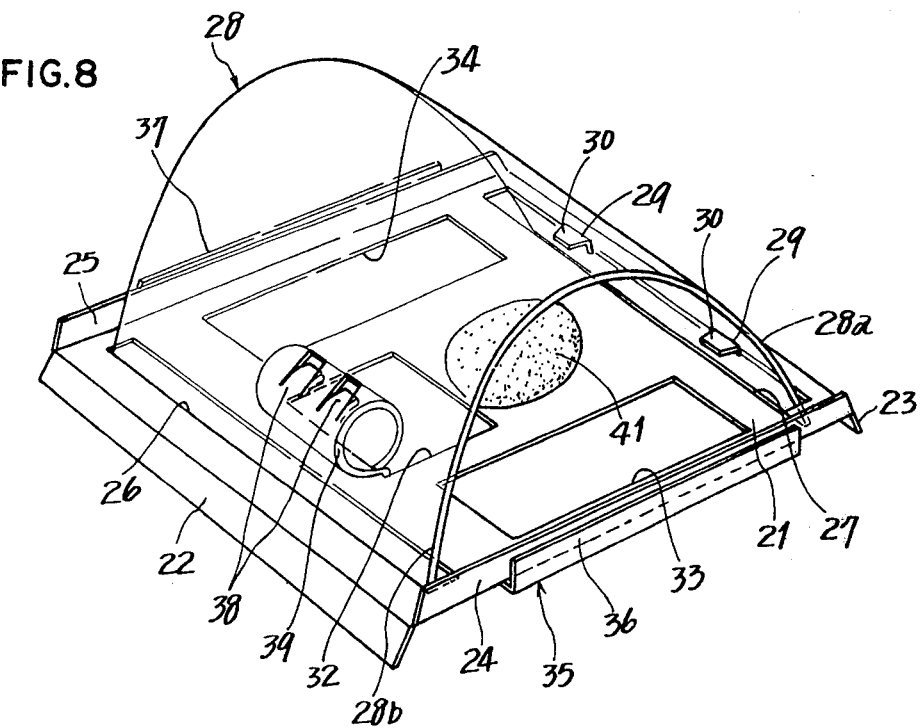
FIGS. 8 through 10 show a third embodiment of the invention.
Figure 9:
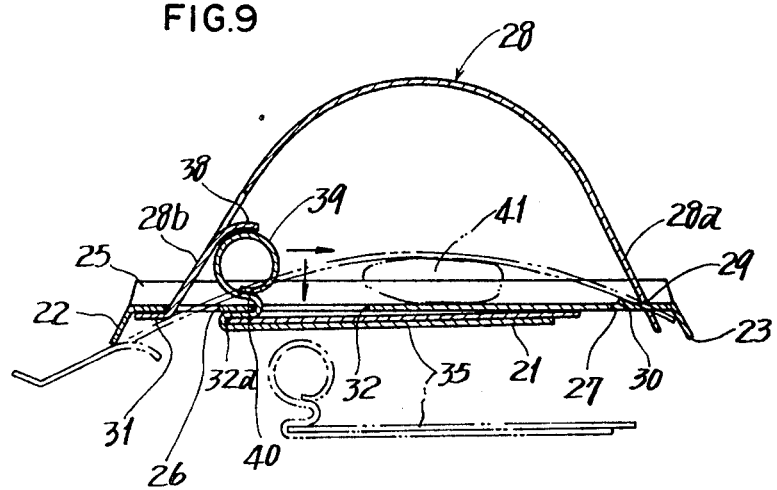

A third embodiment of the invention will now be described with reference to FIGS. 8 through 10.

Designated at 21 is a base plate having downward bends 22 and 23 on the front and rear end edges and upward bends 24 and 25 on the lateral edges, said base plate 21 being formed with elongated openings 26 and 27 near the front and rear ends. Designated at 28 is an elastic plate for squeezing a rat between it and said base plate 21, made of a transparent synthetic resin. The elastic plate 28 has holes 29, 29 at its base end engaged with projections 30, 30 formed in the elongated opening 27 in the rear end of said base plate 21, the free end 28b of said elastic plate being inserted in the elongated opening 26 at the front end of the base plate 21 and then extending below the base plate 21. Designated at 31 is the free-end bend of the elastic plate 28. Designated at 32 is a rectangular opening disposed somewhat nearer to the center than to the front-end elongated opening 26 in said base plate 21. Designated at 33 and 34 are rectangular openings formed in the base plate 21 and extending on opposite sides of said rectangular opening 32 substantially over the distance between said elongated openings 26 and 27. Further, 35 designates a footboard set under said base plate 21 and having upward bends 36 and 37 on opposite sides thereof and a transversely extending cylindrical engagement member 39 on the front middle upper region thereof adapted to engage engagement projections 38, 38 formed on the elastic plate 28 near the central region of the free end thereof. The transversely extending cylindrical engagement member 39 is provided by cylindrically bending a single plate and fixing one end of said plate with respect to said footboard 35, and the front lower portion of said engagement member 39 is formed with a groove 40 for receiving the front edge 32a of the rectangular opening 32 in said base plate 21. In addition, the attachment of the base end 28a of the elastic plate 28 to the base plate 21 may be by pivotal mounting as by a pin as in the second embodiment.

In the above arrangement, when it is to be set for catching rats, with the free end of the elastic plate 28 pushed upwardly with respect to the base plate 21 from the front-end elongated opening 26 in the base plate 21 so as to bend the elastic plate 28 in a curve, the footboard 35 is placed under the base plate 21 with its cylindrical engagement member 39 projecting above the base plate 21 through the rectangular opening 32 and the footboard 35 is then forwardly moved to establish engagement between the groove 40 and the front edge 32a of the rectangular opening 32, thereby establishing engagement between the transversely extending cylindrical engagement member 40 and the engagement projection 38 on the elastic plate 28. In this manner, it is set in a tunnel form, and then a bait 41 is placed in the middle of the base plate 21. In this condition, the trap is laid in a location where rats are supposed to appear. When a rat appears in this location, it perceives the bait 41 on the base plate 21 and tries to tread on the base plate 21. When it treads on the base plate 21, it passes either of the rectangular openings 33 and 34, resulting in the weight of the rat acting on the footboard 35 under that opening, moving the engagement member 39 so that the engagement between the latter and the engagement projections 38, 38 tends to be relieved. When the engagement begins to be relieved, the elastic restoring force of the elastic plate 28 acts to relieve the engagement, so that the engagement member 39 is disengaged from the engagement projections 38, 38 and passes downwardly through the rectangular opening 32 and at the same time, the elastic plate 28 is elastically restored to its original condition, thereby instantaneously squeezing the rat between it and the base plate 21.

Figure 10:
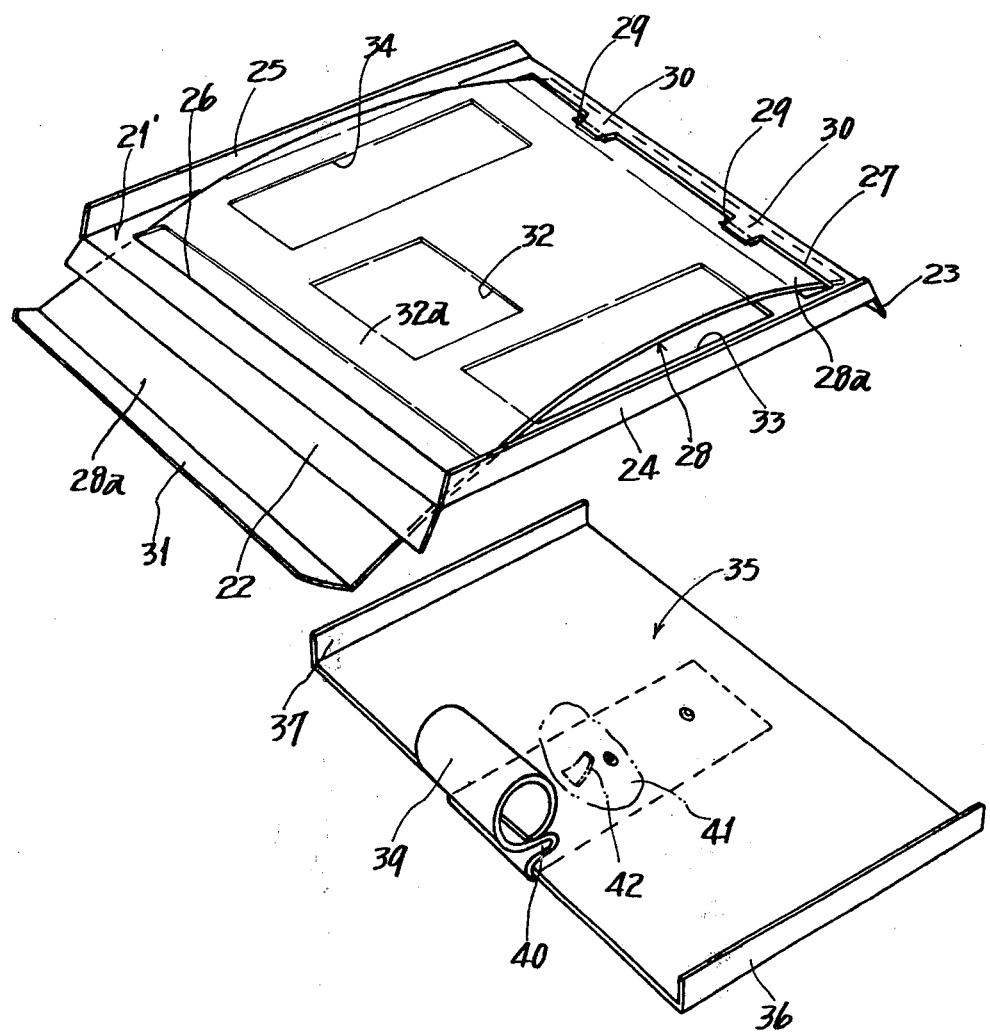

In addition, as shown in phantom lines in FIG. 10, it is also possible to form a partly cut and raised upward projection 42 on the footboard 35 so that when the latter is set under the base plate 21, said projection 42 projects above the base plate 21 through the rectangular opening 32 and the bait 41 is attached to said projection 42. With the arrangement thus made, even if a rat, which is very cautious, tries to take the bait 41 avoiding the rectangular opening 33 or 34 without treading on the footboard 35, the latter is moved when the rat takes the bait 41, relieving the engagement between the engagement member 39 and the engagement projections 38, 38, so that the rat can be instantaneously squeezed between the elastic plate 28 and the base plate 21.

Figure 11:
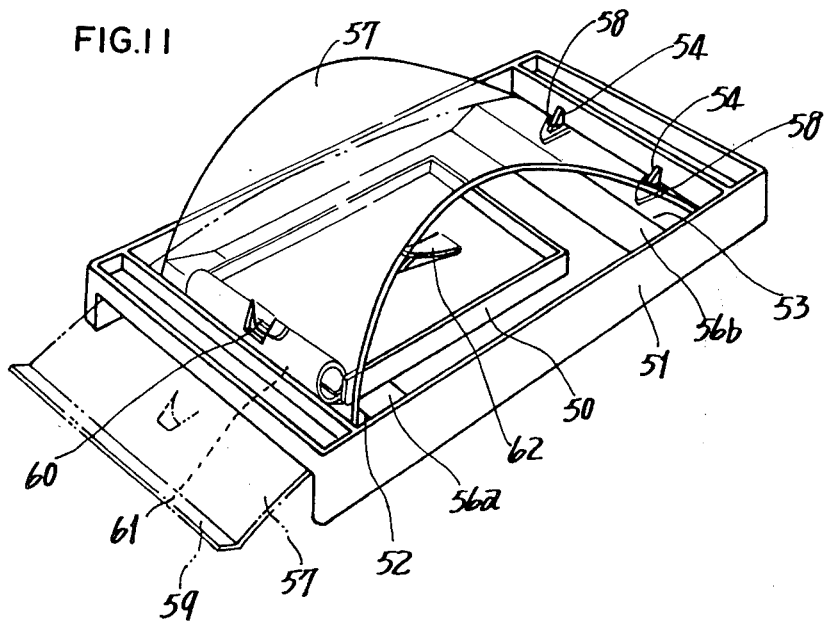
FIGS. 11 and 12 show a fourth embodiment of the invention.
Figure 12:
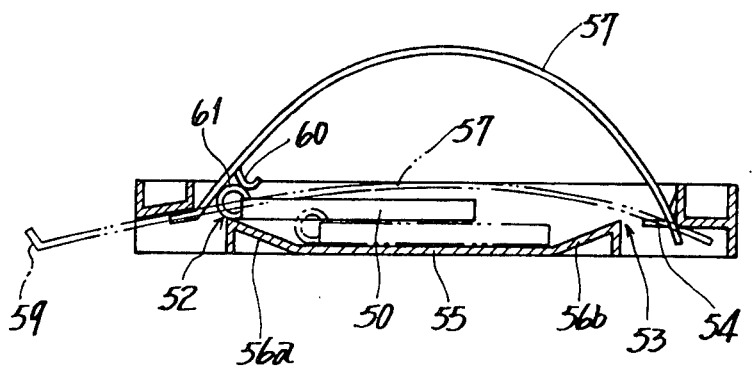

A fourth embodiment of the invention will now be described with reference to FIGS. 11 and 12.

This embodiment differs from the third embodiment in that the footboard 35 is replaced by a bait tray or footboard 50 which is placed between the elastic plate and the base plate. In this embodiment, the base plate 51 is made of synthetic resin and as shown it is injection-molded into a frame form. At the front and rear ends, it is formed with elongated openings 52, 53 and projections 54, similar to those shown in the third embodiment. The bottom plate portion 55 of the base plate between the elongated openings 52 and 53 is located below the level of the elongated openings 52, 53 and its opposite ends terminate in slopes 56a and 56b ascending toward the end edges of the elongated openings 52, 53. The elastic plate 57, the hole 58 at its base end, and the free end bend 59 are the same as those described above. Further, an engagement projection 60 at the free end of the elastic plate 57 is formed by bending and its front end is arcuately bent. The front end of the bait tray or footboard 50 is integrally formed with a transversely extending engagement member 61 engageable with said projection 60. In addition, a bait attaching projection 62 may be provided in the middle of the bait tray or footboard 50, as shown in FIG. 11.

In order to set this trap, with the elastic plate 57 curved, the engagement member 61 on the bait tray or footboard 50 (hereinafter referred to as the bait tray) is interposed in pressed condition between the engagement projection 60 on the elastic plate and the upper end edge of the slope 56a in such a manner that the bait tray 50 is lifted above the bottom plate 55 of the base plate 51, as shown. A bait agreeing with the kind of a small animal to be caught is placed on or attached to the bait tray 50.

With the arrangement thus made, a light touch on the bait tray 50 or even a touch on it from below is effective to move the bait tray 50, and since the engagement member 61 is interposed in engaged condition between the engagement projection 60 and the upper end edge of the slope 56a, even a slight movement of the bait tray relieves such engagement. Thus, when the engagement begins to be relieved, the elastic restoring force of the elastic plate 57 acts in such a manner as to relieve the engagement, so that it is instantaneously relieved. Therefore, this embodiment is effective particularly when used to catch injurious birds, such as sparrows, not to mention rats. Further, in this embodiment, since the bottom plate portion 55 is located below the level of the elongated openings 52 and 53, the bait tray 50, when relieved from the engagement, falls onto the bottom plate 55, so that there is no possibility of the bait tray 50 interfering with the restoration of the elastic plate 57 to its flat condition. Thus, capture of a small animal between the elastic plate 57 and the base plate 51 can be positively effected.

I claim:

1. A trap for small animals doing harm to possessions, comprising a base plate whose one longitudinal end is formed with an elongated opening, an elastic plate whose base end is rotatably supported at the other end of said base plate and whose free end passes through said elongated opening and further extends to the front end side, an engagement projection on said elastic plate near the free end thereof, and an engagement member adapted to be interposed between the upper surface of said base plate and said engagement projection with said elastic plate upwardly curved between its base end and said elongated opening.

2. A trap as set forth in claim 1, wherein said engagement member is cylindrical.

3. A trap as set forth in claim 2, wherein said engagement member is a solid bait.

4. A trap as set forth in claim 2, wherein said engagement member has a bait attaching or holding member integrally attached thereto.

5. A trap as set forth in claim 2, wherein said engagement member has a footboard integrally attached thereto which a small animal entering onto the base plate cannot help treading on.

6. A trap as set forth in claim 5, wherein said base plate is supported above the level of the surface on which it is supported, said base plate is formed with openings on the widthwise opposite sides thereof and extending substantially over the entire length thereof, and the footboard disposed under said opening is connected to said engagement member.

7. A trap as set forth in claim 5, wherein the base plate portion between the position said elongated opening is formed in said base plate and the position where the base end of the elastic plate is supported is located below the levels of the two positions, and the footboard integrally extending from said engagement member is supported as located above the base plate portion.

8. A trap as set forth in claim 2, wherein said engagement projection is formed by being arcuately bent from the free end side of the elastic plate and engages the upper end of the engagement member.

9. A trap as set forth in claim 2, wherein said engagement projection is formed by being bent from the free end side of the elastic plate and its front end is arcuately inwardly bent.

10. A trap as set forth in claim 1, wherein rising pieces are formed on the widthwise opposite edges of the base plate.

* * * * *